(12) United States Patent
Schlansker et al.

(10) Patent No.: US 7,146,480 B2
(45) Date of Patent: Dec. 5, 2006

(54) CONFIGURABLE MEMORY SYSTEM

(75) Inventors: Michael S. Schlansker, Los Altos, CA (US); Boon Seong Ang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 304 days.

(21) Appl. No.: 10/350,458

(22) Filed: Jan. 23, 2003

(65) Prior Publication Data

US 2004/0148483 A1    Jul. 29, 2004

(51) Int. Cl.
*G06F 12/00* (2006.01)
*G06F 13/00* (2006.01)
*G06F 13/14* (2006.01)
*G06F 15/00* (2006.01)
*H04L 7/00* (2006.01)

(52) U.S. Cl. .................. 711/170; 711/173; 710/3; 710/305; 713/401; 709/224; 709/225

(58) Field of Classification Search ........... 709/224, 709/225; 712/200; 703/28; 713/401; 711/170, 711/173; 710/1, 305
See application file for complete search history.

(56) References Cited

U.S. PATENT DOCUMENTS

| | | | | |
|---|---|---|---|---|
| 4,486,832 | A * | 12/1984 | Haubner et al. | 713/401 |
| 5,758,195 | A * | 5/1998 | Balmer | 712/300 |
| 5,960,191 | A * | 9/1999 | Sample et al. | 703/28 |
| 6,092,180 | A * | 7/2000 | Anderson et al. | 712/200 |
| 6,405,286 | B1 * | 6/2002 | Gupta et al. | 711/127 |
| 6,993,639 | B1 * | 1/2006 | Schlansker et al. | 712/18 |
| 2002/0152305 | A1 * | 10/2002 | Jackson et al. | 709/224 |
| 2003/0048797 | A1 * | 3/2003 | Sandstrom | 370/402 |
| 2003/0188251 | A1 * | 10/2003 | Brown et al. | 714/763 |
| 2004/0010650 | A1 * | 1/2004 | Vinnakota et al. | 710/305 |

OTHER PUBLICATIONS

The Transputer, Colin Whitby-Stevens, Sigarch Newsletter, vol. 13, Issue 3, Jun. 1985, ISSN: 0149-7111, pp. 292-300.
The Message-Driven Processor: A Multicomputer Processing Node with Efficient Mechanisms, William J. Dally et al., IEEE 1992, ISSN: 0272-1732/92/0400-0023, pp. 23-39.
A Variable Instruction Stream Extension to the VLIW Architecture, Andrew Wolfe et al., ACM 1991, Architectural Support for Programming Languages and Operating Systems, ISBN: 0-89791-380-9.

* cited by examiner

*Primary Examiner*—Mano Padmanabhan
*Assistant Examiner*—Mardochee Chery

(57) ABSTRACT

A configurable memory system is disclosed, which includes a processor-to-memory network, a memory-to-processor network, and a plurality of memory modules. Both networks in turns include a plurality of transport cells that can be configured to implement various transport networks, one for a particular memory application. To implement different memory applications in the same configurable memory system, a system designer takes several steps. The system designer identifies memory applications to be implemented in the configurable memory system. For each memory application, the designer allocates a set of memory modules and a transport network carrying data for the memory modules. Each transport network corresponding to a memory application thus establishes the data paths to and from the memory modules for that memory application. For each transport cell in the allocated networks, the designer develops a configuration table indicating the transport networks, one being associated with a memory application using that transport cell. The designer then creates reservation and/or conflict tables describing the timing relationships between the memory applications. Based on the reservation and/or conflict tables, scheduling execution of the memory applications can be performed.

46 Claims, 21 Drawing Sheets

All the "O" are transport cells 1305

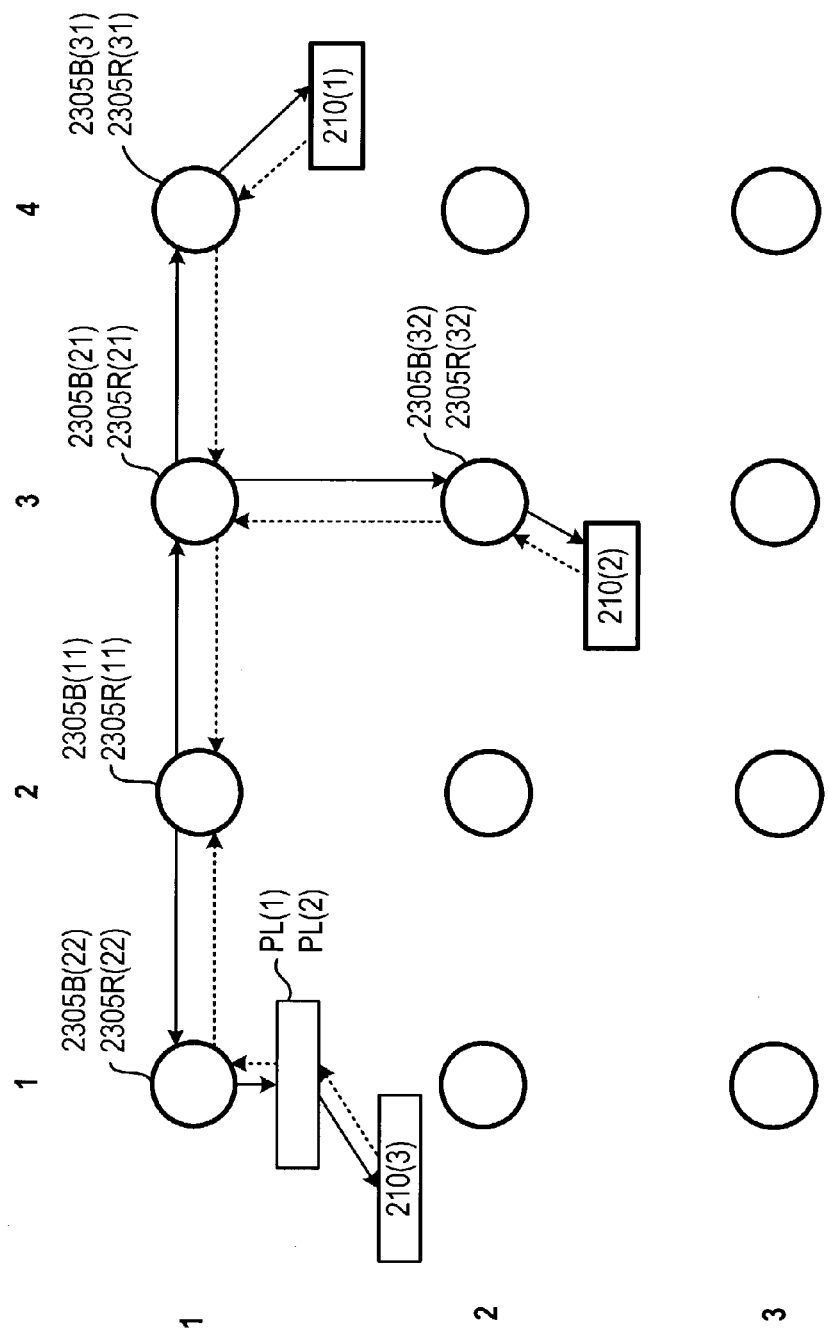

|  | N | E | S | W | M |
|---|---|---|---|---|---|
| Entry 1 | 0 | 1 | 0 | 1 | 0 |
| Entry 2 | 1 | 0 | 0 | 0 | 0 |

|  | 0 | 1 | 2 | 3 | 4 |
|---|---|---|---|---|---|
| $LN_1$ | $C_{i,1,0}$ | $C_{i,1,1}$ | $C_{i,1,2}$ | $C_{i,1,3}$ | $C_{i,1,4}$ |
| $LN_2$ | $C_{i,2,0}$ | $C_{i,2,1}$ | $C_{i,2,2}$ | $C_{i,2,3}$ | $C_{i,2,4}$ |
| $LN_3$ | $C_{i,3,0}$ | $C_{i,3,1}$ | $C_{i,3,2}$ | $C_{i,3,3}$ | $C_{i,3,4}$ |
| $LN_4$ | $C_{i,4,0}$ | $C_{i,4,1}$ | $C_{i,4,2}$ | $C_{i,4,3}$ | $C_{i,4,4}$ |

| Time (after issuing a Wt) | 0 | 1 | 2 | 3 |
|---|---|---|---|---|
| Wt | 1 | 0 | 0 | 0 |
| Rd | 1 | 0 | 0 | 0 |

— 1100A

| Time (after issuing a Wt) | 0 | 1 | 2 | 3 | 4 | 5 | 6 |
|---|---|---|---|---|---|---|---|
| Wt | 1 | 0 | 1 | 0 | 1 | 0 | 1 |
| Rd | 1 | 0 | 1 | 0 | 1 | 0 | 1 |

| Memory Operation | Issue Time |
|---|---|
| Wt+a | t |
| Wt+b | t+1 |
| Rd-e | t+2 |
| Wt-c | t+3 |
| Wt+d | t+5 |

| Time (after issuing a Wt) | 0 | 1 | 2 | 3 |
|---|---|---|---|---|
| R1 | 1 | 0 | 0 | 0 |
| R2 | 0 | 1 | 0 | 0 |
| R3 | 0 | 1 | 0 | 0 |
| R4 | 0 | 0 | 1 | 0 |
| R5 | 0 | 0 | 1 | 0 |
| R6 | 0 | 0 | 1 | 0 |
| R7 | 0 | 0 | 0 | 0 |
| R8 | 0 | 0 | 0 | 1 |
| R9 | 0 | 0 | 0 | 1 |
| R10 | 0 | 0 | 0 | 1 |

| Time (after issuing a Rd) | 0 | 1 | 2 | 3 | 4 | 5 | 6 |
|---|---|---|---|---|---|---|---|
| R1 | 1 | 0 | 0 | 0 | 0 | 0 | 1 |
| R2 | 0 | 1 | 0 | 0 | 0 | 1 | 0 |
| R3 | 0 | 1 | 0 | 0 | 0 | 1 | 0 |
| R4 | 0 | 0 | 1 | 0 | 1 | 0 | 0 |
| R5 | 0 | 0 | 1 | 0 | 1 | 0 | 0 |
| R6 | 0 | 0 | 1 | 0 | 0 | 0 | 0 |
| R7 | 0 | 0 | 0 | 0 | 1 | 0 | 0 |
| R8 | 0 | 0 | 0 | 1 | 0 | 0 | 0 |
| R9 | 0 | 0 | 0 | 1 | 0 | 0 | 0 |
| R10 | 0 | 0 | 0 | 1 | 0 | 0 | 0 |

1200B

| Time | t | t+1 | t+2 | t+3 | t+4 | t+5 | t+6 |
|---|---|---|---|---|---|---|---|
| R1 | 0 | 0 | 0 | 0 | 0 | 0 | 0 |
| R2 | 0 | 0 | 0 | 0 | 0 | 0 | 0 |
| R3 | 0 | 0 | 0 | 0 | 0 | 0 | 0 |
| R4 | 0 | 0 | 0 | 0 | 0 | 0 | 0 |
| R5 | 0 | 0 | 0 | 0 | 0 | 0 | 0 |
| R6 | 0 | 0 | 0 | 0 | 0 | 0 | 0 |
| R7 | 0 | 0 | 0 | 0 | 0 | 0 | 0 |
| R8 | 0 | 0 | 0 | 0 | 0 | 0 | 0 |
| R9 | 0 | 0 | 0 | 0 | 0 | 0 | 0 |
| R10 | 0 | 0 | 0 | 0 | 0 | 0 | 0 |

1200C

| Time | t | t+1 | t+2 | t+3 | t+4 | t+5 | t+6 |
|------|-----|-----|-----|-----|-----|-----|-----|
| R1 | 1/0 | 0/0 | 0/0 | 0/0 | 0 | 0 | 0 |
| R2 | 0/0 | 1/0 | 0/0 | 0/0 | 0 | 0 | 0 |
| R3 | 0/0 | 1/0 | 0/0 | 0/0 | 0 | 0 | 0 |
| R4 | 0/0 | 0/0 | 1/0 | 0/0 | 0 | 0 | 0 |
| R5 | 0/0 | 0/0 | 1/0 | 0/0 | 0 | 0 | 0 |
| R6 | 0/0 | 0/0 | 1/0 | 0/0 | 0 | 0 | 0 |
| R7 | 0/0 | 0/0 | 0/0 | 0/0 | 0 | 0 | 0 |
| R8 | 0/0 | 0/0 | 0/0 | 1/0 | 0 | 0 | 0 |
| R9 | 0/0 | 0/0 | 0/0 | 1/0 | 0 | 0 | 0 |
| R10 | 0/0 | 0/0 | 0/0 | 1/0 | 0 | 0 | 0 |

1200D

| Time | t | t+1 | t+2 | t+3 | t+4 | t+5 | t+6 |
|---|---|---|---|---|---|---|---|
| R1 | 1 | 0 | 0 | 0 | 0 | 0 | 0 |
| R2 | 0 | 1 | 0 | 0 | 0 | 0 | 0 |
| R3 | 0 | 1 | 0 | 0 | 0 | 0 | 0 |
| R4 | 0 | 0 | 1 | 0 | 0 | 0 | 0 |
| R5 | 0 | 0 | 1 | 0 | 0 | 0 | 0 |
| R6 | 0 | 0 | 1 | 0 | 0 | 0 | 0 |
| R7 | 0 | 0 | 0 | 0 | 0 | 0 | 0 |
| R8 | 0 | 0 | 0 | 1 | 0 | 0 | 0 |
| R9 | 0 | 0 | 0 | 1 | 0 | 0 | 0 |
| R10 | 0 | 0 | 0 | 1 | 0 | 0 | 0 |

— 1200E

| Time | t | t+1 | t+2 | t+3 | t+4 | t+5 | t+6 |
|---|---|---|---|---|---|---|---|
| R1 | 1/1 | 0/0 | 0/0 | 0/0 | 0 | 0 | 0 |
| R2 | 0/0 | 1/1 | 0/0 | 0/0 | 0 | 0 | 0 |
| R3 | 0/0 | 1/1 | 0/0 | 0/0 | 0 | 0 | 0 |
| R4 | 0/0 | 0/0 | 1/1 | 0/0 | 0 | 0 | 0 |
| R5 | 0/0 | 0/0 | 1/1 | 0/0 | 0 | 0 | 0 |
| R6 | 0/0 | 0/0 | 1/1 | 0/0 | 0 | 0 | 0 |
| R7 | 0/0 | 0/0 | 0/0 | 0/0 | 0 | 0 | 0 |
| R8 | 0/0 | 0/0 | 0/0 | 1/1 | 0 | 0 | 0 |
| R9 | 0/0 | 0/0 | 0/0 | 1/1 | 0 | 0 | 0 |
| R10 | 0/0 | 0/0 | 0/0 | 1/1 | 0 | 0 | 0 |

— 1200F

| Time | t | t+1 | t+2 | t+3 | t+4 | t+5 | t+6 |
|---|---|---|---|---|---|---|---|
| R1 | 1 | 1/0 | 0/0 | 0/0 | 0/0 | 0 | 0 |
| R2 | 0 | 0/1 | 1/0 | 0/0 | 0/0 | 0 | 0 |
| R3 | 0 | 0/1 | 1/0 | 0/0 | 0/0 | 0 | 0 |
| R4 | 0 | 0/0 | 0/1 | 1/0 | 0/0 | 0 | 0 |
| R5 | 0 | 0/0 | 0/1 | 1/0 | 0/0 | 0 | 0 |
| R6 | 0 | 0/0 | 0/1 | 1/0 | 0/0 | 0 | 0 |
| R7 | 0 | 0/0 | 0/0 | 0/0 | 0/0 | 0 | 0 |
| R8 | 0 | 0/0 | 0/0 | 0/1 | 1/0 | 0 | 0 |
| R9 | 0 | 0/0 | 0/0 | 0/1 | 1/0 | 0 | 0 |
| R10 | 0 | 0/0 | 0/0 | 0/1 | 1/0 | 0 | 0 |

1200G

| Time | t | t+1 | t+2 | t+3 | t+4 | t+5 | t+6 |
|---|---|---|---|---|---|---|---|
| R1 | 1 | 1 | 0 | 0 | 0 | 0 | 0 |
| R2 | 0 | 1 | 1 | 0 | 0 | 0 | 0 |
| R3 | 0 | 1 | 1 | 0 | 0 | 0 | 0 |
| R4 | 0 | 0 | 1 | 1 | 0 | 0 | 0 |
| R5 | 0 | 0 | 1 | 1 | 0 | 0 | 0 |
| R6 | 0 | 0 | 1 | 1 | 0 | 0 | 0 |
| R7 | 0 | 0 | 0 | 0 | 0 | 0 | 0 |
| R8 | 0 | 0 | 0 | 1 | 1 | 0 | 0 |
| R9 | 0 | 0 | 0 | 1 | 1 | 0 | 0 |
| R10 | 0 | 0 | 0 | 1 | 1 | 0 | 0 |

1200H

CONFIGURABLE MEMORY SYSTEM

FIELD OF THE INVENTION

The present invention relates generally to computing systems and, more specifically, to a configurable memory system.

BACKGROUND OF THE INVENTION

Most memory systems are general purpose such as those used in personal computers, workstations, and other processing systems. These memory systems typically provide a small number of memory access ports that allow reading and writing data within a single addressable memory array. Parallelism and memory bandwidth are increased by pipelining a stream of requests and adding more access ports. These memory systems are flexible and suitable for a broad range of applications, but cannot provide efficient performance for specialized applications that require high memory bandwidth at low cost.

Memory systems are also customized within ASICS (application-specific integrated circuits) for applications such as digital signal processing. Here, by taking advantage of known application-specific memory needs, memory systems are structured to provide higher performance at lower cost than general-purpose memory systems. To increase performance and reduce costs, special purpose memory systems often define a number of smaller memories that can be referenced in parallel. However, these memory systems are customized to an application, and cannot be used for applications with differing memory needs.

Reconfigurable logic allows designers to implement various logic circuits within a previously fabricated hardware chip by programming switching and logic elements in the chip to reproduce a given hardware design. This hardware design activity is performed by configuring logic within an existing chip, which offers the promise that efficient special purpose processing systems can be designed using reconfiguration without chip design. However, memories in this approach are fixed and components are non-configurable even within a reconfigurable chip. Thus, designers cannot easily construct high performance memory systems having multiple memories of differing size using reconfigurable chip technology alone.

Based on the foregoing, it is desirable that mechanisms be provided to overcome deficiencies of existing approaches and to solve related problems.

SUMMARY OF THE INVENTION

The present invention, in various embodiments, describes a configurable memory system, which, in one embodiment, includes a processor-to-memory network, a memory-to-processor network, and a plurality of memory modules. Both networks in turns include a plurality of transport cells that can be configured to implement various transport networks, e.g., one for a particular memory application, a memory subsystem etc.

Embodiments of the invention thus allow designers to construct memory systems specialized to application needs using preexisting configurable hardware, e.g., the memory modules, the transport cells, the devices embodying the configurable memory system, etc. In general, a memory system used by a memory application corresponds to a memory configuration in the configurable memory system, and one or multiple configurations may be loaded into the configurable memory system to support the application's memory needs. If multiple memory configurations are loaded, then, in accordance with techniques of the invention, the application can quickly switch from one memory configuration to another one, as desired.

To implement multiple memory applications in the same configurable memory system, a system designer takes several steps. The system designer identifies the memory applications to be implemented in the configurable memory system. For each memory application, the designer allocates a set of memory modules and a transport network carrying data for the memory. The transport network may provide latches to allow pipelining of a stream of request operations. Each transport network corresponding to a memory application thus establishes the data paths to and from the memory for that memory application. For each transport cell in the allocated networks, the designer develops a configuration table wherein an entry of the table is associated with a memory application using that transport cell. The designer then creates reservation and/or conflict tables describing the resource conflict and timing relationships between the memory applications. Conflict tables describe resource conflicts that may arise when parallel and pipelined memory requests are overlapped, i.e., a second request is submitted before a first request is finished. Based on the conflict tables, the designer schedules execution of the memory applications. Scheduling efficiently uses the transport networks by packing memory requests in a parallel and pipelined fashion without violating conflict tables.

BRIEF DESCRIPTION OF THE DRAWINGS

The present invention is illustrated by way of example, and not by way of limitation, in the figures of the accompanying drawings in which like reference numerals refer to similar elements and in which:

FIG. 5B illustrates how the example of FIG. 2 may be implemented using the device in FIG. 5A, in accordance with one embodiment;

FIG. 6 shows a configuration table for a transport cell in FIG. 5B, in accordance with one embodiment;

FIG. 7B shows a conflict table, in accordance with one embodiment;

DETAILED DESCRIPTION OF THE PREFERRED EMBODIMENT

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Figure 1:
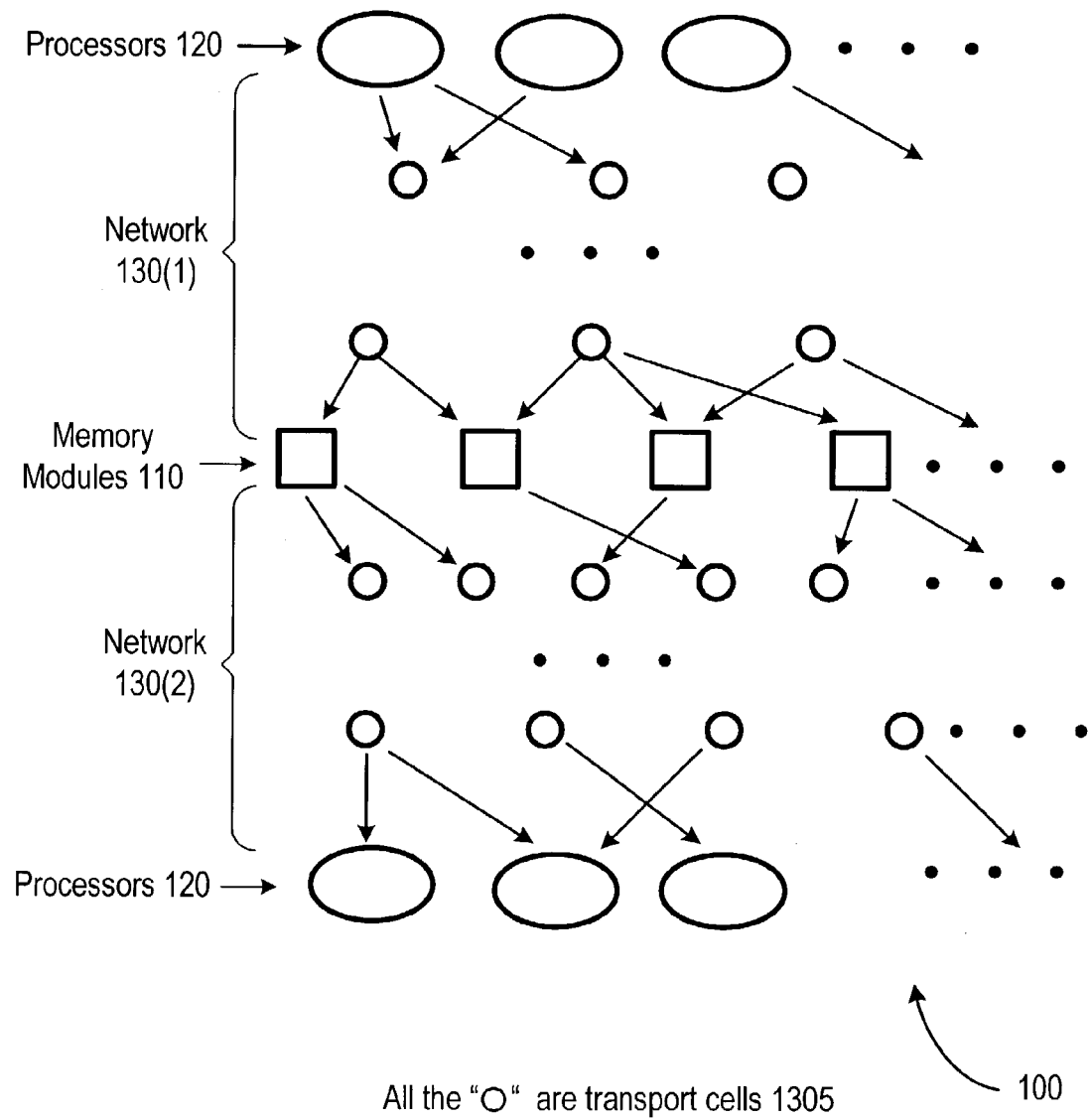
FIG. 1 shows a processing system upon which embodiments of the invention may be implemented.

FIG. 1 shows a processing system 100 upon which embodiments of the invention may be implemented. System 100 includes a plurality of memory modules or RAM blocks 110, a plurality of processors 120, a processor-to-memory network 130(1) and a memory-to-processor network 130(2). Networks 130 together with memory modules 110 may be referred to as a configurable memory system, fabric, infrastructure, etc., and may be implemented as part of the configurable technologies on the hardware or devices such as field programmable gate arrays (FPGAs), system on chips (SOCs) with configurable components, other reconfigurable devices, etc. Examples of memory operations in system 100 include read, write, memory swap, test and set, lock operations, etc.

Memory modules 110 may have different widths and depths. Memory width refers to the number of bit wide for a memory word while memory depth refers to the number of words allowable in a memory module 110. In one embodiment, memory modules 110 are connected in a bus manner as described in S. Wilton et al, "Memory-to-Memory Connection Structures in FPGA's with Embedded Memory Arrays," FPGA '97, ACM Symp. on FPGAs, February 1997, pp. 10–16.

Processors 120 are commonly found in computer systems and may be referred to as the brain of the computers. Generally, processors 120 execute instructions stored in memory, control logic, process information, perform arithmetic and logical operations, etc. Processors 120 may also be state-machine controlled hardware in which the processors are hardwired with their programs encoded in state-machines.

Processor-to-memory network 130(1) can be programmed to provide various logical networks of transport cells 1305 that carry commands and data from processors 120 to memory modules 110, including, for example, memory commands (e.g., read, write, etc.), memory addresses, data to be written into memory modules 110, etc. A logical network of transport cells may be referred to as a transport network. Similarly, memory-to-processor network 130(2) can be programmed to provide various transport networks that carry information from memory modules 110 to processors 120, such as data read from memory modules 110, the data status, etc. Even though FIG. 1 shows two separate networks processor-to-memory 130(1) and memory-to-processor 130(2), both networks 130 may use the same set of transport cells 1305. Transport cells 1305 in networks 130 are connected to one another in various ways such as 2-dimensional mesh connection, 3-dimensional mesh connection, butterfly network, etc. Networks 130 and/or transport cells 1305 may provide latches to allow pipelining request operations. A memory application uses at least one memory module 110 and a transport network. Examples of memory applications include video buffers, lookup tables, etc.

Embodiments of the invention thus allow designers to construct memory systems specialized to application needs using preexisting configurable hardware, e.g., memory modules 110, networks of transport cells 130, etc. In general, a memory configuration in system 100 corresponds to a memory system used by a memory application, and a memory application may use one or multiple memory configurations. One or multiple configurations may be loaded into processing system 100 to support the application's memory needs. If multiple memory configurations are loaded, then embodiments of the invention allow the application to quickly switch from one memory configuration to another one, as desired.

Exemplary Network for Use by an Exemplary Memory Application

Figure 2:
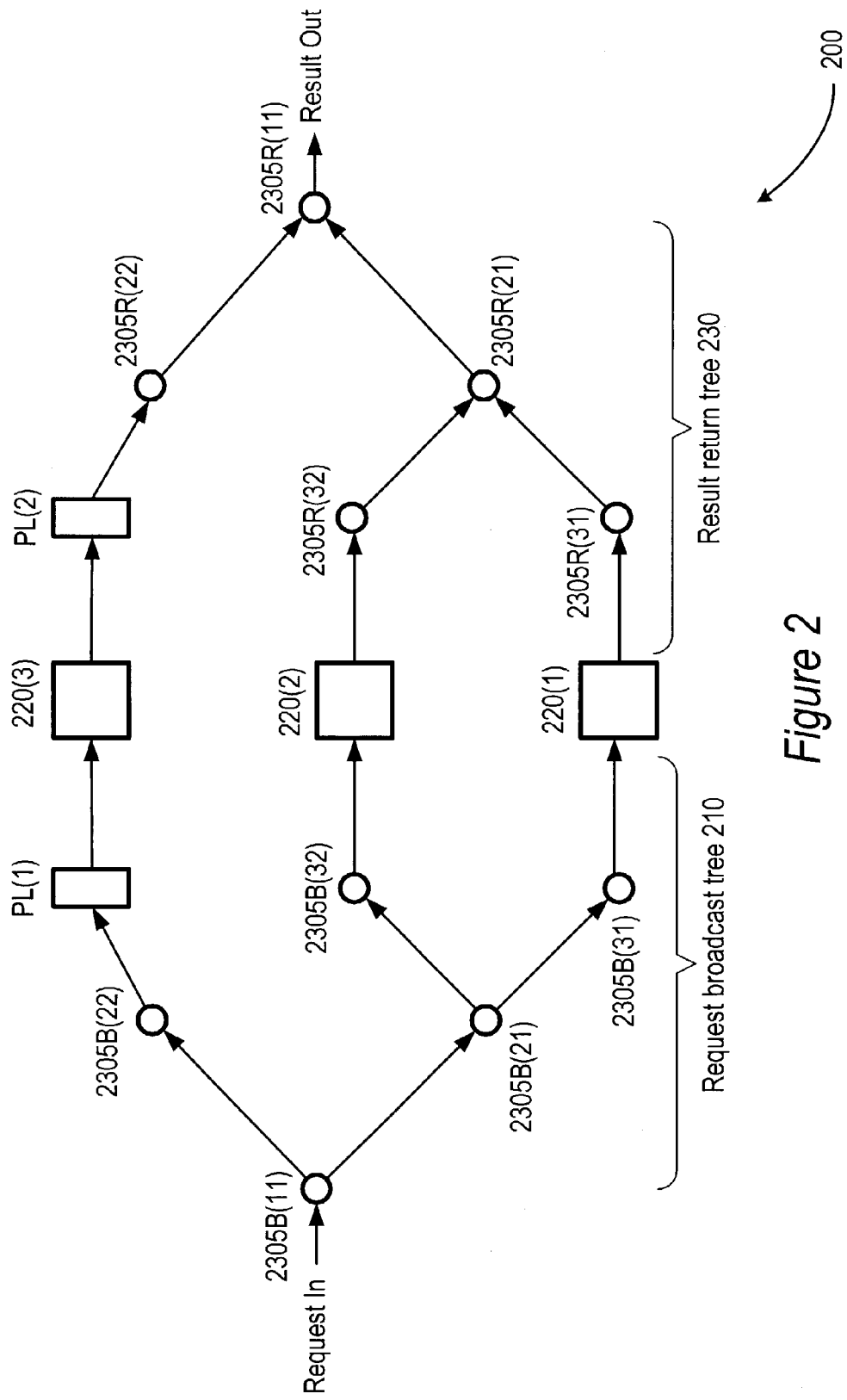
FIG. 2 shows a memory system used by a memory application, in accordance with one embodiment.

FIG. 2 shows an exemplary memory system 200 used by an exemplary memory application, e.g., application MA0, in accordance with one embodiment. System 200 is a subset of system 100 and includes a request broadcast tree 210, memory modules 220(1), 220(2) and 220(3), and a result return tree 230. Request broadcast tree 210 is a subset of processor-to-memory network 130(1), memory modules 220 are selected from memory modules 110 in system 100, and result return tree 230 is a subset of memory-to-processor network 130(2).

Request broadcast tree 210 includes transport cells 2305B (11), 2305B(21) and 2305B(22), 2305B(31) and 2305B(32), and a padding latch PL(1). Transport cells 2305B are selected from transport cells 1305 of FIG. 1. As discussed above, transport cells 1305, and thus 2305, may have internal latches to allow pipelined transportation of data. Transport cell 2305B(11) being the root of tree 210 normally communicates with processors 120 or other computing units. Request broadcast tree 210 carries memory requests from its root, e.g., cell 2305B(11), to its leaves, e.g., cells 2305B(31) and 2305B(32), and to memory modules 220(1), 220(2), and 220 (3). To reach memory modules 220(3), the memory request travels through padding latch PL(1), which, for illustration purposes, has a pipelined latency matched to the chosen pipelined latency of a transport cell, e.g., one cycle. The memory request reaches a memory module 220 after an appropriate number of clock cycles. In the FIG. 2 example, if traveling through one level of tree 210 takes one clock cycle, then traveling from transport cell 2305B(11) to a memory module 220 takes three cycles. Request broadcast tree 210 is pipelined when a second memory request is broadcast prior to completion of broadcasting a first memory request.

Memory modules 220 process commands such as loads and stores that retrieve and/or alter the memory contents. One or more memory modules 220 may respond to a request, providing a full or partial result. In one embodiment, multiple partial results are OR'ed to yield a final result. Partial results may include components of a memory word such as a lower order byte, a higher order byte, etc. After a request is processed at a memory module 220, this memory module may return information to be carried by return result tree 230.

Return result tree 230 includes transport cells 2305R(11), 2305R(21) and 2305R(22), 2305R(31) and 2305R(32), and a padding latch PL(2). The set of transport cells 2305R, like transport cells 2305B, is selected from transport cells 1305, and may be the same as transport cells 2305B. Return result tree 230 carries memory information from memory modules 220 through its leaves, e.g., cells 2305R(31) and 2305R(32) to its root, e.g., cell 2305R(11). To reach transport cell 2305R(22), the information from memory module 220(3) travels through padding latch PL(2). Similar to request broadcast tree 210's clocking mechanism, the memory information reaches root 2305R(11) after appropriate clock cycles. In the FIG. 2 example, if traveling through one level of tree 230 takes one clock cycle, then traveling from a memory module 220 to root cell 2305R(11) takes three cycles. Return result tree 230 may also be pipelined when a second result is returned prior to the complete return of a first result.

A transport cell 2305R may be referred to as a merge point where information from other transport cells or from memory modules may be merged. For example, transport cell 2305R(21) is a merge point merging information from transport cell 2305R(31) and transport cell 2305R(32); transport cell 2305R(11) is a merge point merging information from transport cell 2305R(21) and transport cell 2305R(22), etc. Generally, the information to be merged originates from memory modules 220 and travels through various transport cells to arrive at a merge point. In one embodiment, performing an OR function of information of various transport cells provides the merged result at a merge point.

Dealing with Trees Having Different Heights

In one embodiment, tree 210 or tree 230 is height balanced so that different data paths to various memory modules have the same latency or use the same number of clock cycles. Padding elements such as exemplary padding latches PL(1) and PL(2) in FIG. 2 serve that purpose. In one embodiment, padding latches PL offer programmable latency, such as using shift registers, to equalize the time length of these different data paths. For example, in FIG. 2, continuing with the example that each transport cell has one level of latching and thus takes one clock cycle to traverse, it takes three clock cycles for a piece of data to travel through transport cells 2305B(11), 2305B(21), and 2305B(31), to memory module 210(1). Similarly, it also takes three clock cycles for a piece of data to travel through transport cells 2305B(11), 2305B(21), and 2305B(32), to memory module 210(2). However, without padding latch PL(1), it takes only two cycles for a piece of data to travel through cells 2305B(11) and 2305B(22) to memory module 210(3). Therefore, padding latch PL(1) is added to balance the tree height. For illustration purposes, traveling through padding latch PL(1) takes one cycle like a transport cell, and padding latch PL(1) is added to request broadcast tree 210 so that it takes three cycles for a piece of data to travel from cell 2305B(11), cell 2305(22), and latch PL(1) to memory module 210(3). Analogous to padding latch PL(1), padding latch PL(2) serves to balance return result tree 230. In one embodiment, a padding element, e.g., latches PL, is implemented using a programmable latency padding buffer such as the one disclosed in pending patent application Ser. No. 10/214,990, filed Aug. 8, 2002, entitled "Branch Reconfigurable Systems and Method" by Michael Schlansker et al. Depending on implementations, padding elements may be independent, part of a memory module 110, part of a transport cell 1305, etc.

In general, the latency of the longest path in a tree is chosen, and other shorter paths are padded with padding latches to match the latency of the longest path. Techniques of the invention are also applicable in un-balanced trees and/or sub-trees.

Data and addresses may use different paths to arrive at memory modules, and a height-balanced tree allows the data and address to arrive at the same time so that writing to and reading from the memory modules can reference the correct data.

The Various Diferent Transport Networks

Figure 3:
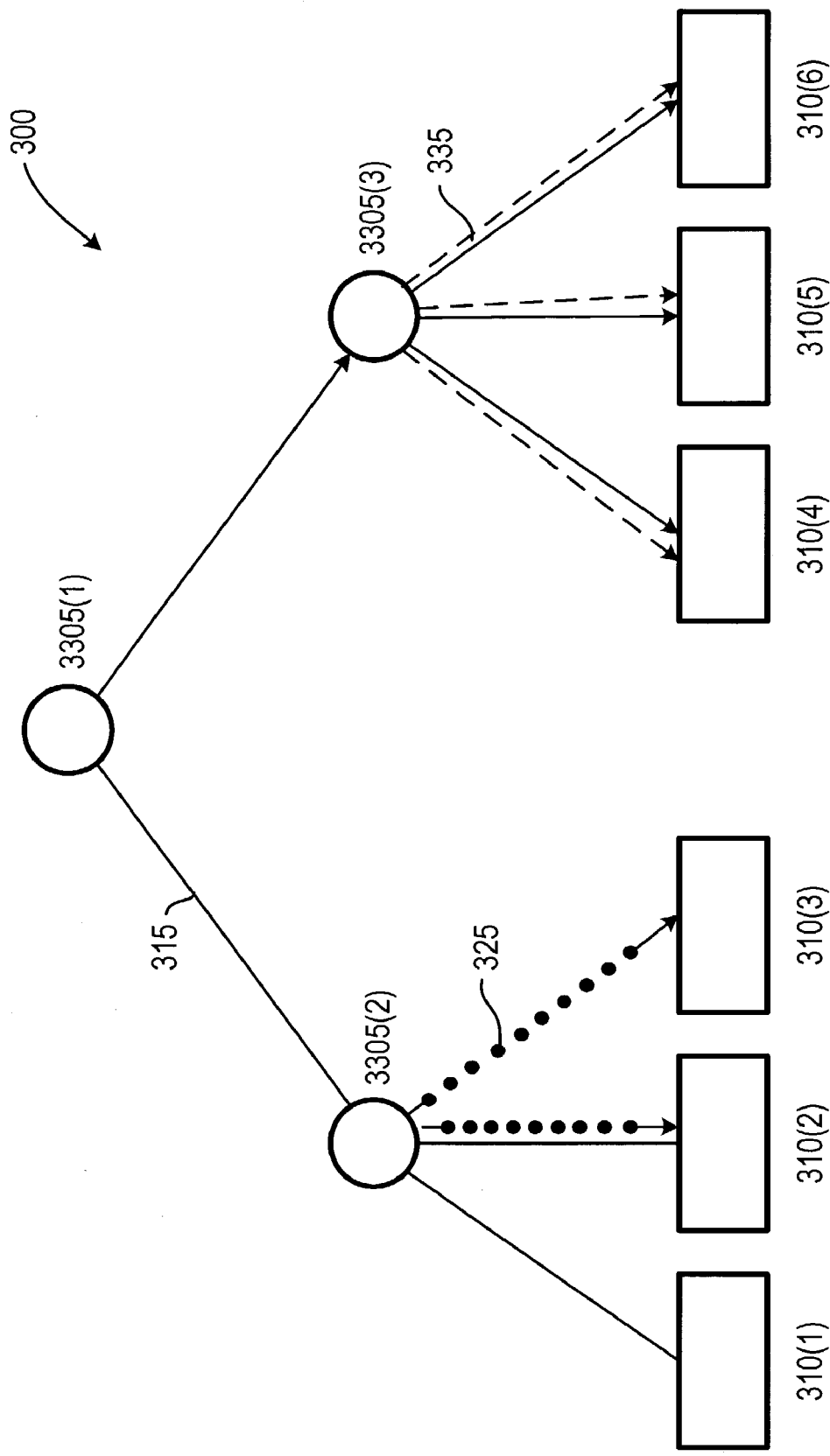
FIG. 3 shows a memory system used by three different memory applications, in accordance with one embodiment.

FIG. 3 shows an exemplary system 300 used by three different memory applications, e.g., MA1, MA2, and MA3, in accordance with one embodiment. System 300 is a subsystem of system 100. For illustration purposes, only broadcast trees are shown, but the concept is also applicable to return result trees. System 300 includes memory modules 310(1), 310(2), 310(3), 310(4), 310(5), and 310(6), and memory transport cells 3305(1), 3305(2), and 3305(3). Memory modules 310 are selected from memory modules 110, and transport cells 3305 are selected from transport cells 1305.

For illustration purposes, memory application MA1 is associated with a transport network having transport cells 3305(1), 3305(2), and 3305(3). Memory application MA1 thus uses this transport network to access memory modules 310(1), 310(2), 310(4), and 310(5), as shown by solid lines 315. Memory application MA2 is associated with a transport network having only one transport cell 3305(2) to access memory modules 310(2) and 310(3), as shown by dotted lines 325. Memory application MA3 is associated with a transport network also having only one transport cell 3305(3) to access memory modules 310(4), 310(5), and 310(6), as shown by dashed lines 335. Lines 315, 325, and 335 highlight the three transport networks associated with memory applications MA1, MA2, and MA3, respectively.

In general, a message is propagated from a transport cell to another transport cell, a memory module, a processor, etc., and a transport cell may be programmed to carry messages traveling through different transport networks of different memory applications. In FIG. 3, transport cell 3305(1) is associated with only transport network 315 and carries data to transport cells 3305(2) and 3305(3). Transport cell 3305 (2) is associated with transport networks 315 and 325. For transport network 315, transport cell 3305(2) transmits data to memory modules 310(1) and 310(2), and, for transport network 325, transport cell 3305(2) transmits data to memory modules 310(2) and 310(3). Transport cell 3305(3) is associated with transport networks 315 and 335. For transport network 315, transport cell 3305(3) transmits data to memory modules 310(4) and 310(5), and, for transport network 335, transport cell 3305(3) transmits data to memory modules 310(4), 310(5), and 310(6).

Route Identifier

Because of the different transport networks associated with a transport cell, a message traveling through a transport cell includes a route-identifier (route-id) to identify the transport cell outputs through which the message travels. Depending on implementations, the route-id for the return transport network of a memory operation that involves a return value may be different from that of the request transport network route-id. In such cases, a mechanism is provided to determine the return transport network route-id from the request message. For example, a read request may carry with it the route-ids for both the request tree and the return tree. The requester thus has the flexibility to specify a return route-id that sends the return result to a third party. The mechanism also enables the return results to several requests issued with the same request route-id to be sent to different recipients. Alternatively, the return route-id may be derived from the request route-id through an operation such as subtracting a value from the request route-id, thus associating each request route-id to a return route-id, etc. Alternatively, a memory module may keep a table that maps the request route-id to the return route-id. When processing a request that results in a return, the memory module does a table lookup to acquire the return route-id.

In embodiments using programmable latency padding buffer, a route-id is also used to select the desired latency incurred as a message passes through the padding buffer. The route-id is used to look up a table in the buffer to find out the desired delay for the message. The message is then inserted at the appropriate place in the padding buffer's shift queue to produce the desired delay.

The Transport Cells

Figure 4:
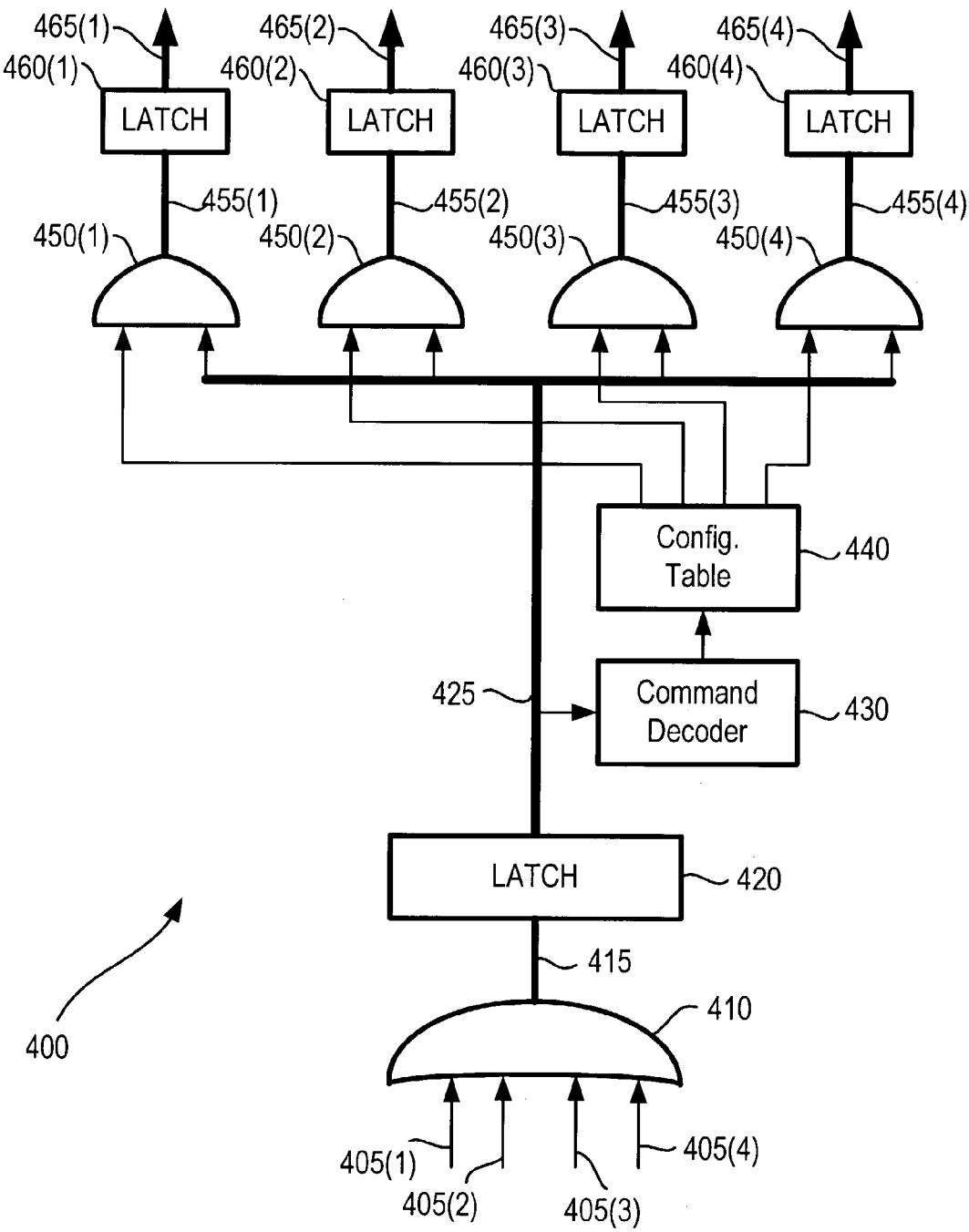
FIG. 4 shows a transport cell, in accordance with one embodiment.

FIG. 4 shows a transport cell 400 being an embodiment of a transport cell 1305. Transport cell 400 includes a plurality of inputs 405, an "OR" gate 410, a latch 420, a command decoder 430, a configuration table 440, a plurality of AND gates 450, a plurality of latches 460, and a plurality of outputs 465.

The number of inputs 405 and outputs 465 varies depending on the topology of transport cell 400. Adding inputs 405 to OR gate 410 adds inputs to transport cell 400 while adding AND gates 450 and latches 460 adds outputs to transport cell 400. Similarly, subtracting inputs 405 from OR gate 410 subtracts inputs from transport cell 400, and subtracting AND gates 450 subtracts outputs from transport cell 400.

Inputs 405 receive information or messages from, such as, a processor, a neighboring transport cell, a memory module, etc. For example, in FIG. 2, inputs 405 of transport cell 2305B(21) receive information from transport cell 2305B(11); inputs 405 of transport cell 2305R(31) receive information from memory module 210(1), etc. In one embodiment, a binary zero represents a null message, and, due to the nature of an OR gate, a null message appearing at an input 405 has no effect on the non-null messages propagating from inputs 405 to the output of OR gate 410 on line 415. In general, only one non-null message is allowed at any of the inputs 405 on a given clock cycle. Exceptions exist such as in result merge trees in which the data from several inputs are sometimes merged by OR gate 410 to produce a combined message. OR gate 410 is used in one embodiment, but can be substituted by its equivalences, such as a vector-OR.

Latch 420 latches data on line 415 to line 425, and a latch 460 latches data from a line 455 to a line 465. Latches 420 and 460 are used for pipelining, a technique that allows for high-clock speed. Pipelining divides a long combinational logic path into several segments or stages, separated by latches. As a result, signals only have to pass through shorter combinatorial paths between neighboring latches, resulting in faster system clocks and thus higher throughput because multiple instances of the messages traversing a transport cell can be in progress, each occupying a different stage of the pipeline. In the context of a tree, e.g., request broadcast tree or result merge tree, latches 420 and 460 allow more messages to be in flight at the same time, each in a different level of the tree.

Because there are two levels of latches, 420 and 460, a piece of data traveling through a transport cell 400 takes two cycles. These latches may be eliminated to reduce the number of clock cycles. For example, if transport cell 400 does not include latch 460, then transport cell 400 has only one level of latching, i.e., through latch 420, and a piece of data traveling through transport cell 400 takes one cycle. Such a transport cell is appropriate for the examples of FIGS. 2 and 5B, which use exemplary transport cells with one cycle latency. Conversely, additional levels of latches may be added to a transport cell as appropriate, such as to allow for even higher clock speed.

Command decoder 430 extracts the route-id from the input message that is latched into latch 420. The extracted route-id is then used as a key to perform a lookup in configuration table 440. The result of this lookup is a bit-vector that controls AND gates 450. Depending on the method chosen for loading data into configuration table 440, command decoder 430 may have additional responsibilities. For example, if commands for configuring the transport cells are distributed using the network of transport cells, then command decoder 430 is responsible for distinguishing between configuration commands and normal memory messages. Further, in the former case, command decoder 430 also initiates appropriate actions to update the transport cells' configuration as requested.

Each AND gate 450 determines whether a message on line 425 propagates to a line 455 and thus output 465. If an AND gate 450 is enabled, then the message can propagate through that AND gate 450 and latch 460, to its corresponding output 465. Conversely, if an AND gate 450 is disabled, then the message cannot propagate through that AND gate. Each AND gate 450 is controlled, i.e., enabled or disabled, by a bit-vector stored in configuration table 440, and setting/resetting the bit corresponding to an AND gate enables/disables that AND gate. For example, four bits B1, B2, B3, and B4 of a bit vector V1 correspond to four AND gates 450(1), 450(2), 450(3), and 450(4), respectively, and, if bit B1 is set while bits B2, B3, and B4 are reset, then only AND gate 450(1) is enabled while AND gates 450(2), 450(3), and 450(4) are disabled. As a result, if only AND gate 450(1) is enabled, data on line 425 is only allowed to propagate through AND gate 450(1) to output 465(1). However, if the data on line 425 is desired to propagate to output 465(2), output 465(3), or output 465(4), then bits B2, B3, or B4 corresponding to AND gates 450(2), 450(3), and 450(4) can be set accordingly.

Outputs 465 provide information or messages to, such as, a neighboring transport cell, a memory module, a processor, etc. In FIG. 2, when appropriate AND gates 450 are enabled, outputs 465 of transport cell 2305B(11) provide information to transport cells 2305B(21) and 2305B(22). Similarly, outputs 465 of transport cell 2305R(31) provide information to transport cell 2305R(21), etc.

As discussed above, a transport cell may be associated with various transport networks, and, as such, messages in a transport cell travel from inputs 405 to at least one AND gate 450 that may feed into inputs of another transport cell. As a result, enabling the appropriate AND gates 450 in a transport cell is part of setting the corresponding transport networks or configurations of the memory application using the transport networks. In one embodiment, configuration table 440 of a transport cell stores information for each transport network that uses that transport cell. The information associated with a transport network is identified, e.g., looked up, by the transport network's route-id, and includes the bit-vector for controlling AND gates 450 when a message using that transport network is passing through the transport cell. As data travels through a transport cell 1305, cell 1305, based on the route-id of the data, uses the corresponding entry in table 440 to appropriately transmit the data to the appropriate outputs. In embodiments where a transport network corresponds to a memory application, transport cell 1305, by selecting the configuration entries, effectively switches configuration of one memory application to another application.

Loading data into table 440 can use various methods. In one embodiment, memories that store table 440 are memory mapped onto a common bus and loaded by a central controller. In an alternative embodiment, serial paths such as scan chains are used to load table 440. In an alternative embodiment, self-reconfiguration logic allows self-reconfiguration, whereby loading of configuration tables is done using the network of transport cells whose configuration tables are being updated. In this embodiment, command decode 430 identifies and presents the update messages to configuration table 440. This embodiment also allows a subset of a reconfigurable system to reconfigure its configuration tables without interfering with the operation of the rest of the configurable system.

In one embodiment, transport cells 400 are built from the logic blocks in configurable devices, e.g., FPGAs, embodying processing system 100.

Exemplary Configuration Table for a Transport Cell

Figure 5A:
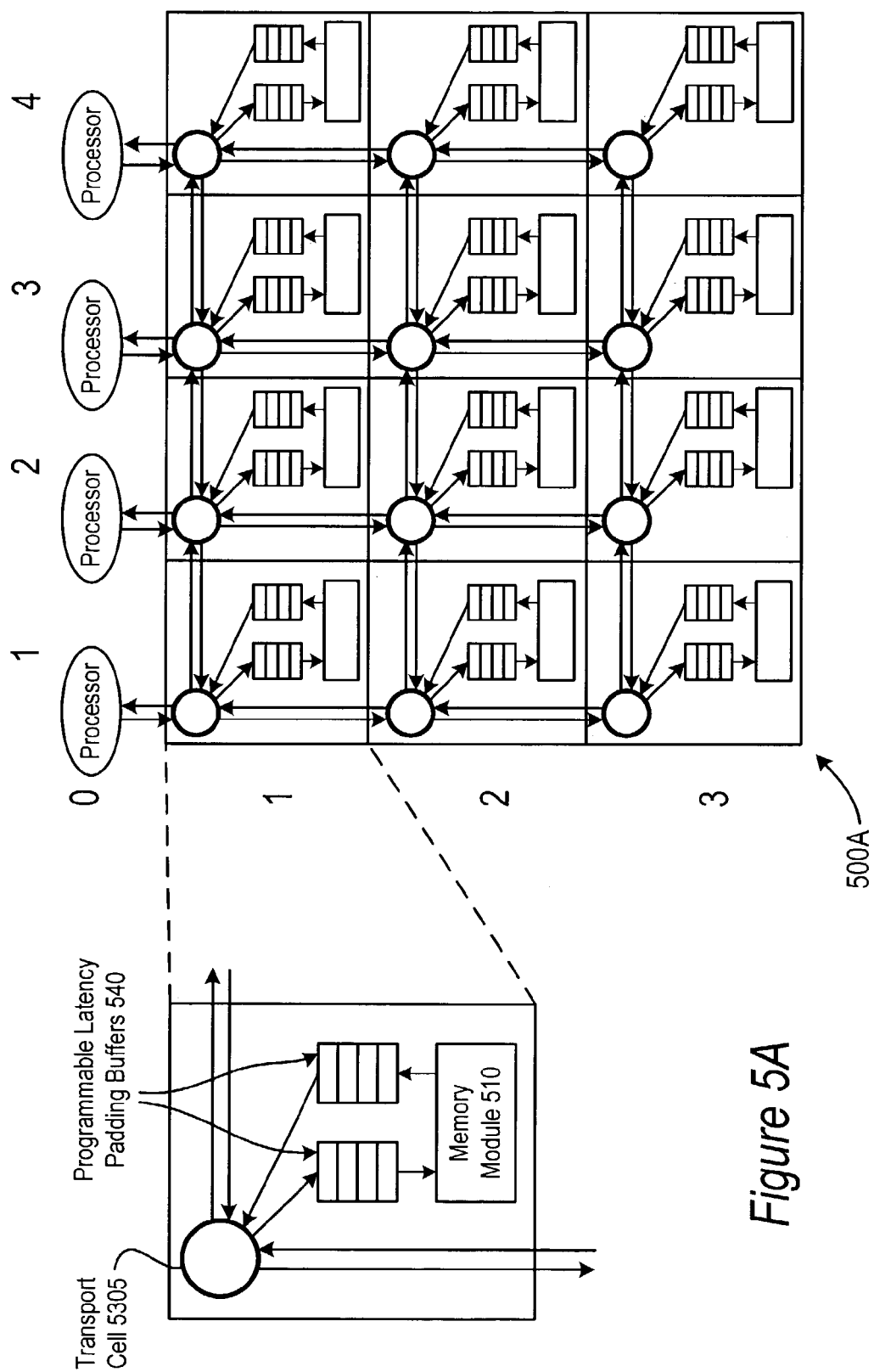
FIG. 5A shows a configurable device having a plurality of transport cells laid out as a grid and implementing the processing system in FIG. 1, in accordance with one embodiment.

FIG. 5A shows an exemplary reconfigurable device 500A implementing an embodiment of processing system 100, in accordance with one embodiment. Device 500A includes a 4×4 grid of tiles. Row 0 comprises processors 120, while rows 1–3 comprise tiles each of which includes a transport cell 5305, a memory module 510, and padding elements 540, which are embodiments of a transport cell 1305, a memory module 110, and programmable padding buffers, respectively. Each memory module 510 is connected to its associated transport cell 5305 via programmable latency padding buffers 540. When latency padding is not needed, latency padding buffers 540 can be by-passed. Each transport cell 5305 is also connected to neighboring transport cells in a two-dimensional mesh topology. Transport cells 5305 in row 1 are connected to corresponding processors in row 0. For illustration purposes, for each transport cell 5305 in FIG. 5A, AND gates 450(1), 450(2), 450(3), 450(4), and 450(5) correspond to the north, east, south, west, and local memory module directions of that transport cell, respectively. For ease of reference, a coordinate notation (x, y) is used to refer to the cell at row x and column y.

FIG. 5B illustrates how the example of FIG. 2 may be mapped on to reconfigurable device 500A of FIG. 5A. For broadcast tree 210, cell (1,2) implements cell 2305B(11) in FIG. 2. Cell (1,1) implements cell 2305B(22) and padding latch PL(1). Cell (1,3) implements cell 2305B(21). Cell (1,4) implements cell 2305B(31), and cell (2,3) implements cell 2305B(32). Cells (1,4), (2,3), and (1,1) are coupled to memory modules 210(1), 210(2), and 210(3), and thus memory modules 510 in cells (1,4), (2,3), and (1,1), respectively. The connections for broadcast tree 210 are shown in solid lines.

For return result tree 220, cell (1,4) implements cell 2305R(31). Cell (2,3) implements cell 2305R(32). Cell (1,1) implement padding latch PL(2) and cell 2305R(22). Cell (1,3) implements cell 2305R(21), and cell (1,2) implements cell 2305R(11). The connections for return tree 230 are shown in dashed lines.

Figure 6:
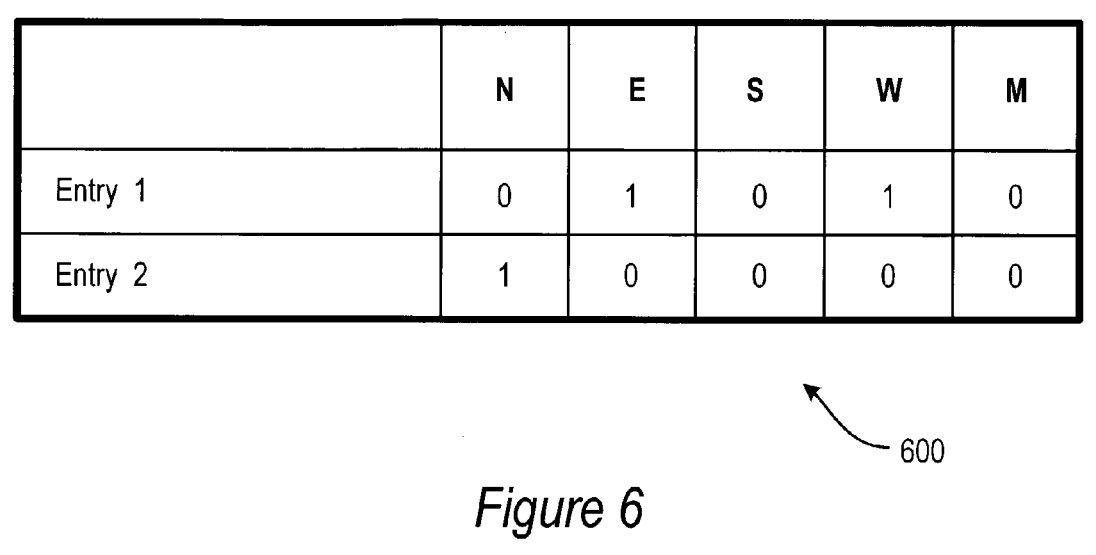

FIG. 6 shows a configuration table 600 implementing configuration 440 associated with cell (1,2) in FIG. 5B. Because cell (1,2) carries data for two transport networks, one for broadcast tree 210 and one for return tree 230, table 440 includes two entries, e.g., entry 1 corresponding to the broadcast tree and entry 2 corresponding to the return tree. Entry 1 having logical zeros at column N(north), S(south), and M(local memory module) indicates that AND gates 450(1), 450(3) and 450(5) corresponding to the north, south and local memory module directions are not used and thus disabled. However, entry 1 having logical ones at column E(east) and W(west) indicates that AND gates 450(2) and 450(4) corresponding to the east and west directions are used and thus enabled. Similarly, entry 2 having logical zeros at columns E, S, W, and M indicates that AND gates 450(2), 450(3), 450(4), and 450(5) are not used and thus disabled while a logical one at column N indicates that AND gate 450(1) is used and thus enabled.

Configuration table 600 corresponding to cell (1,2) is used as an example, configurations tables for other cells may be created and used in accordance with techniques of the invention.

Because resources, e.g., transport cells, memory modules, etc., may be used by various memory applications at various time overlaps, embodiments of the invention use reservation and/or conflict tables to avoid conflicts in using resources by the various applications.

The Reservation Tables

Figure 7A:
FIG. 7A shows a reservation table, in accordance with one embodiment.

FIG. 7A shows a reservation table 700A for a transport network, e.g., $LN_p$, in accordance with one embodiment. Each row in table 700A corresponds to a shared resource that that may be used by another transport network. For illustration purposes, table 700A includes four rows for four resources associated with four transport cells $TC_1$, $TC_2$, $TC_3$, and $TC_4$, respectively. A column in table 700A corresponds to a latency or a clock cycle, and the number of columns is up to the number of clock cycles used by a command traversing network $LN_p$. Five clock cycles corresponding to five columns 0, 1, 2, 3, and 4 are used for illustration purposes in table 700A.

Entries of table 700A provide values or coefficients that specify when each shared resource is used by network $LN_p$, and is thus not available to other transport networks. A coefficient $U_{p,q,d}$ indicates whether the resource represented by row q is used by the network $LN_p$, d cycles after a command is initiated on network $LN_i$.

In one embodiment, to determine coefficients $U_{p,q,d}$, simulation is performed by issuing a command on network $LN_p$. The simulation traces the resources utilized by the command as it traverses its networks over time. At each clock cycle, for example, d clocks after the issue of the command, the $d^{th}$ column of the reservation table is filled in. If a resource is used by the command in that clock cycle, a logical one is entered for the row corresponding to that resource. Otherwise, a logical zero is entered.

A reservation table is developed for each transport network and may be used directly by the scheduler to schedule memory operations. Alternatively, a reservation table may be used to generate conflict tables from which the scheduler schedules memory operations.

The Conflict Tables

A conflict table is an alternative way of representing resource conflict information. Compared to reservation tables, conflict tables present a summarized form of the information. FIG. 7B shows a conflict table 700B for a transport network, e.g., $LN_i$, in accordance with one embodiment. A row in table 700B corresponds to a transport network. For illustration purposes, table 700B includes four rows for four transport networks $LN_1$, $LN_2$, $LN_3$, and $LN_4$, respectively. A column in table 700B corresponds to a latency or a clock cycle, and the number of columns is up to the number of clock cycles used by network $LN_i$. Five clock cycles corresponding to five columns 0, 1, 2, 3, and 4 are used for illustration purposes in table 700B.

Entries of table 700B provide values or coefficients that specify when it is acceptable/unacceptable to initiate a command for network $LN_j$ given that a prior command for network $LN_i$ has been issued. A coefficient $C_{i,j,d}$ indicates whether there will be collisions or conflicts between the first message for network $LN_i$ executed at time t with a second message for network $LN_j$ executed at times that are delayed d cycles relative to the first message. A collision or conflict occurs if both messages seek to use a resource in the same cycle. If a collision occurs, then it is unacceptable for a command for network $LN_j$ to be issued d cycles after a command for network $LN_i$ has been issued.

For illustration purposes, the first message for network $LN_i$ starts at time t, and columns 0, 1, 2, 3, and 4 correspond to times t+0 cycle, t+1 cycle, t+2 cycles, t+3 cycles, and t+4 cycles, respectively. In one embodiment, if the first message for network $LN_i$ is initiated and is followed by a second message for network $LN_j$ in d cycles later, and there is no collisions, then coefficient $C_{i,j,d}$ has a logical low, e.g., zero. However, if a collision occurs, then coefficient $C_{i,j,d}$ has a logical one. In another word, when coefficient $C_{i,j,d}$ is a one, initiating the second message for network $LN_j$ exactly d cycles after initiating the first message for network $LN_i$ is not acceptable.

In one embodiment, to determine coefficients $C_{i,j,d}$, simulation is performed by issuing a command on network $LN_i$ followed by a command on network $LN_j$ d cycles later. The simulation traces all the resources needed by both commands as they traverse their networks over time. The simulation looks for collisions, or until one of the commands reaches its destination without any collision. If there is a collision, then $C_{i,j,d}$ is set to a logical one, and if there is no collision, then $C_{i,j,d}$ is set to a logical zero.

Figure 8:
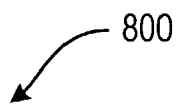
FIG. 8 shows a conflict table for a first exemplary memory application; in accordance with one embodiment.
Figure 9:
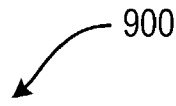
FIG. 9 shows a conflict table for a second exemplary memory application; in accordance with one embodiment.
Figure 10:
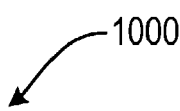
FIG. 10 shows a conflict table for a third exemplary memory application; in accordance with one embodiment.

FIGS. 8, 9, and 10 show conflict tables 800, 900, and 1000 for memory applications MA1, MA2, and MA3, respectively. In FIG. 8 regarding application MA1, a logical one at (M2,1) and (M3,1) indicate that, if, at time t, a command for application MA1 starts, and, at time t+1 cycle, a command for either application MA2 or MA3 starts, then a collision occurs. In FIG. 9, all logical zeros except for a one at (MA2, 0) indicate that, if a command for application MA2 starts at time t, then there is no collision for any command for application MA1 or MA3 that starts at time t or at any cycle after that. Similarly, in FIG. 10, all zeros except for a one at (MA3, 0) indicate that if a command for application MA3 starts at time t, then there is no collision for any command for application MA1 or MA2 that starts at time t or at any cycle after that.

Scheduling Network Usage Using Conflict Tables

Embodiments of the invention use various approaches in which programs are scheduled based on conflict tables, such as those disclosed in J. Gyllenhaal, "A Machine Description Language for Compilation," MS thesis, Department of Electrical and Computer Engineering, University of Illinois, Urbana Ill., September 1994; Wen-mei Hwu et al., "The Superblock: An Effective Technique for VLIW and Superscalar Compilation," The Journal of Supercomputing, Vol 7, 229–248, 1993, Klewer Academic; and in B. Ramakrishna Rau, "Iterative Modulo Scheduling," The International Journal of Parallel Processing, Volume 24, Number 1, February 1996. In Gyllenhall, a machine description language is developed that can be used to model a number of parallel and pipelined processor designs. This model may be used to support the description of multiple logical memory access networks as described in this document. In Hwu, a program is broken into manageable pieces commonly referred to as scheduling units or "superblock." Scheduling units are scheduled separately and in a chosen order, e.g., most frequently executed first. Operations within a scheduling unit are prioritized in a linear list so that time-critical operations are scheduled before non time-critical operations. As scheduling proceeds, the scheduler identifies a set of operations ready to be scheduled. Operations that depend on an operation that has not yet been scheduled cannot be scheduled until all of its predecessors have been scheduled. Among the ready operations, a highest priority ready operation is selected for scheduling. In Rau, software pipeline schedulers provide schedules for innermost loops and allow subsequent loop iterations to begin execution prior to completing previous iterations.

Execution for a return tree may be scheduled separately from execution for the request associated with the return. In that case, the designer accommodates the return to be delayed as desired by the scheduler. Alternatively, the return is scheduled with the request as a unit in which the return is transmitted a predetermined delay after the request is received. In such cases, conflict table 700B deals with the entire operation involving both request and reply instead of individual transport networks.

Figure 11A:
FIG. 11A shows a first conflict table for use in scheduling write operations, in accordance with one embodiment.
Figure 11B:
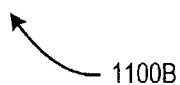
FIG. 11B shows a second conflict table for use in scheduling read operations, in accordance with one embodiment.

As an example, the scheduler schedules four write operations, e.g., Wt-a, Wt-b, Wt-c, Wt-d and one read operation, e.g., Rd-e, on the transport network in FIG. 5B. The scheduler uses illustrative conflict tables 1100A and 1100B in FIGS. 11A and 11B, which correspond to respective write and read operations for the transport network in FIG. 5B. For illustration purposes, there is no data dependence between the exemplary memory operations, and that they are ready to execute at the earliest possible time that the scheduler can schedule. Additionally, when linearized according to priority, these memory operations are arranged in the order of Wt-a, Wt-b, Rd-e, Wt-c, and Wt-d. That is, the scheduler schedules memory operations in the order of Wt-a, Wt-b, Rd-e, Wt-c, and Wt-d. The scheduler starts at time t and proceeds to times t+1 cycle, t+2 cycles, t+3 cycles, etc., until all operations are scheduled. At a particular time or cycle, if a conflict exists, then the scheduler skips scheduling for that cycle and proceeds to the next cycle. Initially, the scheduler schedules operation Wt-a to be issued at time t. Because column 0 in table 1100A has logical ones in both the Wt and Rd rows, the scheduler, after scheduling operation Wt-a, does not schedule any other read or write operation in the same cycle at time t.

Considering time t+1 cycle, the scheduler is able to schedule operation Wt-b because column 1 of table 1100A shows a zero for the Wt row indicating that there is no conflict with the already scheduled operation Wt-a. Once operation Wt-b is scheduled, the scheduler does not schedule any memory operation at time t+1 cycle, as indicated by the logical ones in column 0 of conflict table 1100A.

The scheduler then considers scheduling operation Rd-e at time t+2 cycles. The scheduler checks for conflicts with the already scheduled operation Wt-a and operation Wt-b. For potential conflicts with operations Wt-a and Wt-b, the scheduler checks column 2 and column 1 of table 110A, respectively. In both cases, the rows for Rd show zeros, indicating that there is no conflict. Therefore, the scheduler schedules operation Rd-e for issue at time t+2 cycles. Once operation Rd-e is scheduled, the logical ones in column 0 of table 1100B prohibit another memory operation from being issued in the same cycle at time t+2 cycles.

Next, the scheduler tries to schedule operation Wt-c at time t+3 cycles. The scheduler checks for conflicts against write operation Wt-a, write operation Wt-b, and read operation Rd-e. Regarding write operations Wt-a and Wt-b, the scheduler looks at columns 3 and 2 of FIG. 11A, respectively, which shows zeros indicating that there is no conflict. Regarding operation Rd-e, the scheduler looks at column 1 of table 1100B, which shows zeros indicating that there is also no conflict. Hence, the scheduler schedules operation Wt-c for issue at time t+3 cycles. Once operation Wt-c is scheduled for time t+3 cycles, the logical ones in column 0 of table 1100A prevent other memory operations from being issued in time t+3 cycles.

Finally, the scheduler tries to schedule operation Wt-d at time t+4 cycles. The scheduler checks for conflicts against already issued operations Wt-a, Wt-b, Rd-e, and Wt-c. Because operation Rd-e was scheduled for time t+2 cycles, to check for conflicts at time t+4 cycles, the scheduler examines column 2 of conflict table 1100B. Because this column 2 shows logical ones, indicating a conflict, the scheduler skips scheduling operation Wt-d at time t+4 cycles.

The scheduler then tries time t+5 cycles, and finds no conflicts. In particular, a check in column 3 in read-conflict table 1100B shows a zero for the Wt row. There is also no conflict with the previously issued write operations. In fact, both operation Wt-a and operation Wt-b have already completed, and operation Wt-c, issued two cycles ago, indicates no conflicts in column 2 of its conflict table 1100A. The scheduler thus schedules for operation Wt-d to be issued at time t+5 cycles.

Figure 11C:
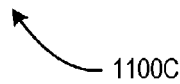
FIG. 11C shows operation schedules of exemplary memory operations, in accordance with one embodiment.

FIG. 11C shows a table 1100C indicating that memory operations Wt-a, Wt-b, Rd-e, Wt-c, and Wt-d are scheduled to be issued at times t, t+1 cycle, t+2 cycles, t+3 cycles, and t+5 cycles, respectively, in accordance with the above example.

Scheduling Network Usage Using Reservation Tables

A scheduler may use reservation tables, instead of the conflict tables, to schedule memory operations. In this approach, the scheduler keeps track of system resource usage over time in a resource usage table, which, in general, has the same rows as the reservation tables, but logically, has a time line as long as is needed for scheduling memory operations. When a new operation, e.g., operation P, is to be scheduled at a time, e.g., T, the reservation table of operation P is compared to the already committed resources represented by the resource usage table. Mechanically, this comparison is akin to overlaying operation P's reservation table on top of the system resource usage table, with the reservation table's $0^{th}$ column aligned with the system resource usage table's $T^{th}$ column. If the overlay results in any reservation-table entry with a logical one overlaying a system-resource-usage table entry with a logical one, then a conflict occurs. In that case, it is not acceptable to schedule operation P at time T. However, if no conflict occurs, then the scheduler schedules operation P at time T. The scheduler also updates the system resource usage table to record the resource required by operation P. Wherever the overlay of P's reservation table on the system resource usage table indicates a logical one, the system resource usage table is updated to include a logical one.

As an example, the above collection of ready memory operations Wt-a, Wt-b, Rd-e, Wt-c and Wt-d is used for scheduling, using reservation tables. For illustration purposes, the system has no operation in progress at time t.

Figure 12A:
FIG. 12A shows a reservation table for write operations for the transport network in FIG. 5B, in accordance with one embodiment.
Figure 12B:
FIG. 12B shows a reservation table for read operations for the transport network in FIG. 5B, in accordance with one embodiment.

FIGS. 12A and 12B show illustrative reservation tables 1200A and 1200B for read and write operations for the transport network of FIG. 5. For illustration purposes, the request and reply are scheduled as a single unit, and, for a read operation, the reply is transmitted one cycle after the arrival of the request message. Tables 1200A and 1200B have ten rows, e.g., row R1 through row R10, each representing a shared resource. Row R1 represents transport cell (1,2) and its output links. Row R2 represents transport cell (1,1) and its output links. Row R3 represents transport cell (1,3) and its output links. Row R4 represents transport cell (1,4) and its output links. Row R5 represents transport cell (2,4) and its output links. Row R6 represents latency padding buffer 540 for messages leaving the memory module 510 at (1,1). Row R7 represents latency padding buffer 540 for messages leaving the memory module 510 at (1,1). Row R8 represents the memory module 510 at (1,1). Row R9 represents the memory module 510 at (1,4). Row R10 represents the memory module 510 at (2,3).

Figure 12C:
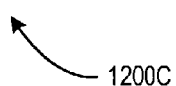
FIG. 12C shows a system resource usage table without a committed resource for the transport network of FIG. 5B.

FIG. 12C shows a system resource usage table 1200C without a committed, e.g., used, resource for the transport network of FIG. 5B. For illustration purposes, table 1200C shows columns with time t to time t+6 cycles. However, table 1200C has as many columns as needed, with new columns added as scheduling proceeds. Entries of columns that are not explicitly shown have logical zeros.

Figure 12D:
FIG. 12D shows a table resulting from overlaying the reservation table in FIG. 12A on the system resource usage table in FIG. 12C.

As the scheduler considers scheduling operation Wt-a at time t, the scheduler overlays reservation table 1200A on system resource usage table 1200C, with table 1200A's $0^{th}$ column aligned to table 1200C's $t^{th}$ column. FIG. 12D shows table 1200D, which is the result of overlaying table 1200A on table 1200C. Each entry in table 1200D that has an overlap is represented by x/y where y is the entry of table 1200C, and x is the entry of table 1200A. Because table 1200D shows no entry with 1/1 and thus no conflict, the scheduler schedules operation Wt-a to be issued at time t.

Figure 12E:
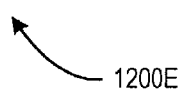
FIG. 12E shows the resource usage table of FIG. 12C that has been updated after operation Wt-a has been scheduled.

System resource usage table 1200C is also updated to produce table 1200E shown in FIG. 12E.

Figure 12F:
FIG. 12F shows a table resulting from overlaying, at time t, the reservation table in FIG. 12A on the system resource usage table in FIG. 12E.
Figure 12G:
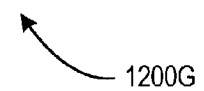
FIG. 12G shows a table resulting from overlaying, at time t+1, the reservation table in FIG. 12A on the resource usage table in FIG. 12E.
Figure 12H:
FIG. 12H shows a system resource usage table updated from the table in FIG. 12E after operation Wt-b has been scheduled.

The scheduler then considers scheduling operation Wt-b. The scheduler attempts to start at time t again. When reservation table 1200A is overlaid on system resource usage table 1200E at column t that results in table 1200F in FIG. 12F, conflicts are shown with entries 1/1, e.g., in (R1, t), (R2, t+1), (R3, t+1), etc. Consequently, the scheduler does not schedule operation Wt-b to be issued at time t, but tries to schedule operation Wt-b at time t+1. FIG. 12G shows table 1200G illustrating the results of overlaying reservation table 1200A on resource usage table 1200E at column t+1. Table 1200G shows no 1/1 entries, indicating no conflicts. The scheduler thus schedules operation Wt-b for issue at time t+1 cycle, and resource usage table 1200E is updated to become resource usage table 1200H shown in FIG. 12H.

The scheduler then schedules the remaining operation Rd-e, Wt-c, and Wt-d in the same manner as it schedules the above illustrative operations Wt-a and Wt-b, and eventually ends up with the schedules shown in table 1100C of FIG. 11C.

Illustrative Steps in Using System 100 for Various Memory Applications

Figure 13:
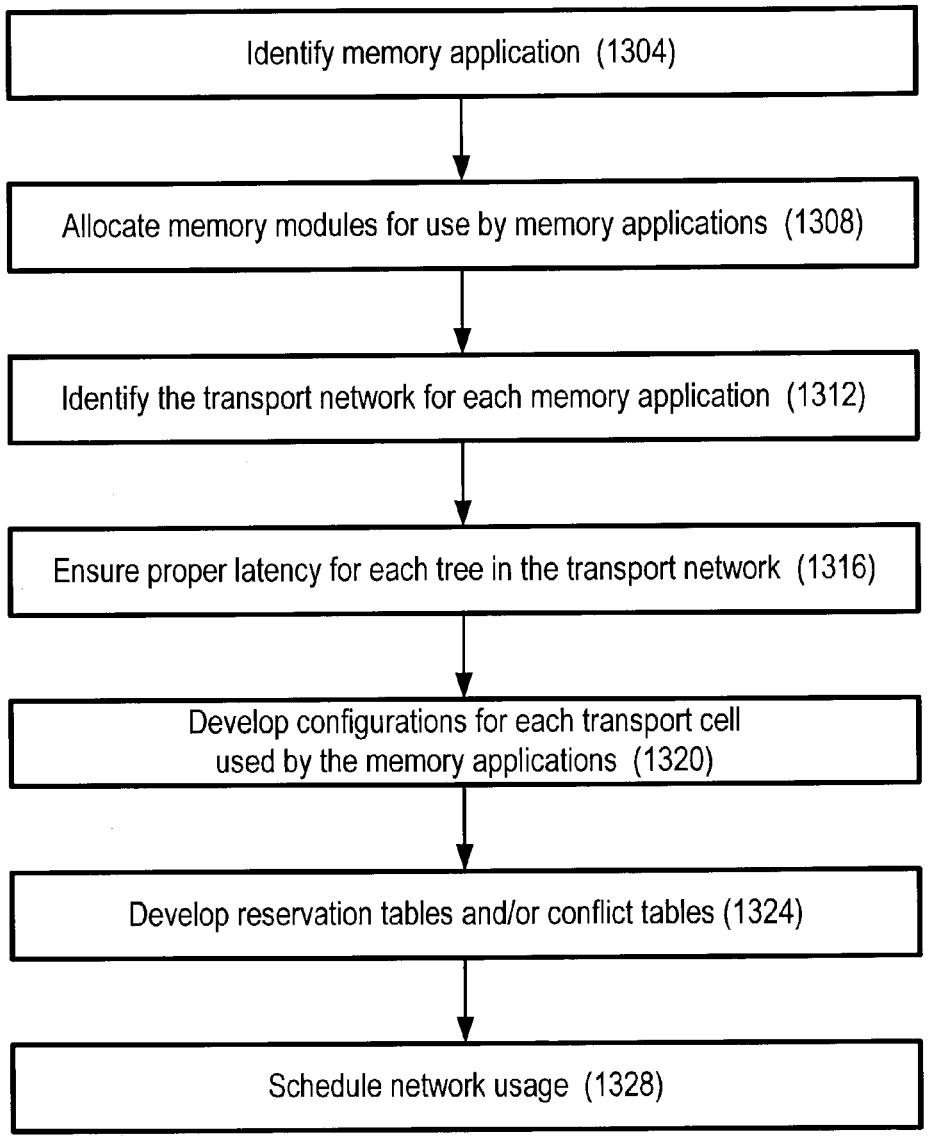
FIG. 13 is a flowchart illustrating the steps in implementing memory applications in the configurable memory system.

FIG. 13 is a flowchart illustrating the steps in using system 100 for various memory applications of which applications MA1, MA2, and MA3 are examples, in accordance with one embodiment. In this example, the term system designer is used, but may refer to a person, a design tool, a software tool, etc., such as a hardware designer, a compiler, a synthesis tool, etc., that can perform the corresponding steps.

In step 1304, a system designer identifies memory applications that use system 100. Applications MA1, MA2, and MA3 are thus identified.

In step 1308, for each memory application, the system designer allocates memory modules for use by that memory application. For example, in FIG. 3, the system designer allocates memory modules 310(1), 310(2), 310(4), and 310(5) for application MA1. The system designer also allocates modules 310(2) and 310(3) for application MA2, and modules 310(4), 310(5), and 310(6) for application MA3.

In step 1312, the system designer identifies the transport network for each memory application and corresponding memory modules, such as the networks represented by transport networks 315, 325, and 335 for applications MA1, MA2, and MA3, respectively.

In step 1316, the system designer ensures proper latency in each tree corresponding to each memory application. FIG. 3 shows balanced trees, and therefore this step requires no further action.

In step 1320, the system designer develops entries for configuration tables for each transport cell used by applications MA1, MA2, and MA3. These tables are created similar to table 600.

In step 1324, the system designer develops conflict tables, e.g., tables 800, 900, and 1000, to describe timing relationships between applications MA1, MA2, and MA3.

In step 1328, the system designer schedules the network usage. The designer packs the requests for memory applications closely in time to improve performance while ensuring that the potential collisions as indicated by the conflict tables are avoided. This step may either be performed statically during design/compilation time, or dynamically at run-time in an on-line fashion Because system 100 provides configurability, embodiments of the invention allow subsets of system 100 to be configured for various memory applications to satisfy customized and application-specific needs. Embodiments of the invention also allow system 100 to change to support multiple memory access requirements for multiple applications and to support changing memory needs. Using the pipelined transport networks, embodiments of the invention also provide high data rate communications to and from memory modules. System 100 also promotes better utilization of the underlying transport cells. Pipelining the transport network enables more memory operations to be in process at the same time, leading to better system throughput. Layering multiple logical transport networks on a set of transport cells and simultaneously supporting these multiple logical transport network further promotes reuse of the underlying transport cells and links between the cells.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for providing a configurable memory system, comprising the steps of:
    providing a plurality of memory modules; and
    connecting a configurable network of transport cells to the plurality of memory modules;
    wherein
        the transport cells constitute the configurable network;
        data passing through a transport cell is based on clock cycles; and
        for a memory application using the configurable memory system, performing the steps of
            selecting a set of memory modules from the plurality of memory modules;
            configuring a set of transport cells that are part of the configurable network to form a transport network that transports data for the selected set of memory modules, wherein the transport network includes a padding element based on a route identifier to equalize a time length between a longer data path and a shorter data path; and
            when two or more memory modules from the selected set of memory modules provide data to the memory application, data from the two or more memory modules are merged to form resulting data.

2. The method of claim 1 wherein the configurable memory system is part of a configurable device.

3. The method of claim 1 wherein
    the transport network includes a plurality of data paths between its root and the selected set of memory module.

4. The method of claim 3 wherein a time delay provided by the padding element is programmable and based on the clock cycles.

5. The method of claim 1 wherein a transport cell of the configured set of transport cells uses a route identification to propagate a message received by that transport cell to an output of that transport cell.

6. The method of claim 5 wherein the route identification is associated with the message.

7. The method of claim 1 wherein
- a transport cell of the configured set of transport cells is associated with a plurality of route identifications corresponding to a plurality transport networks;
- a route identification of the plurality of route identifications corresponds to a transport network of the plurality of transport networks; and
- a message traveling on a transport network of the plurality of networks carries a route identification corresponding to that transport network.

8. The method of claim 1 further comprising the steps of:
- identifying the transport network as the first transport network;
- identifying the configured set of transport cells as the first set of transport cells;
- allowing the first transport network to carry data for the selected set of memory modules; and
- configuring a second transport network including a second set of transport cells from the configurable network of transport cells, for transporting data for the selected set of memory modules.

9. The method of claim 8 wherein the first set of transport cells includes a transport cell from the second set of transport cells.

10. The method of claim 8 wherein the first set of transport cells includes all transport cells from the second set of transport cells.

11. The method of claim 8 wherein the first transport network is identified as a request transport network and the second transport network is identified as a return transport network.

12. The method of claim 11 wherein a route identifier for the request transport network is different from a route identifier for the return transport network.

13. The method of claim 12 wherein a message traveling through the request transport network carries both the route identifier for the request transport network and the route identifier for the return transport network.

14. The method of claim 11 wherein the route identifier for the return transport network is derived from the route identifier for the request transport network.

15. The method of claim 11 further comprising the step of mapping the route identifier for the request transport network to the route identifier for the return transport network.

16. The method of claim 1 wherein a transport cell in the transport network is associated with a plurality of transport networks, and each transport network of the plurality of transport networks is associated with a route identifier.

17. The method of claim 16 wherein the route identifier is associated with a message traveling through each transport network.

18. The method of claim 1 wherein a transport cell of the transport network is associated with a plurality of transport networks and with a configuration table having entries each being associated with a transport network of the plurality of transport networks.

19. The method of claim 1 wherein a first memory operation and a second memory operation use the configurable memory system, and the method further comprising the step of avoiding conflict of resources used by the first memory operation and the second memory operation.

20. The method of claim 19 wherein the step of avoiding uses the clock cycle information in conflict tables to schedule the first memory operation and the second memory operation.

21. The method of claim 19 wherein the step of avoiding uses the clock cycles and information in reservation tables to schedule the first memory operation and the second memory operation.

22. The method of claim 1 wherein a transport cell in the transport network includes a latch enabling pipelining data passing through the transport cell.

23. A configurable memory system, comprising:
- a plurality of memory modules;
- a configurable network of transport cells connected to the plurality of memory modules;
- means for selecting a set of memory modules from the plurality of memory modules;
- means for configuring a set of transport cells from the configurable network of transport cells to form a transport network that transports data for the selected set of memory modules, wherein the transport network includes a padding element based on a route identifier to equalize a time length between a longer data path and a shorter data path;
- wherein
  - the transport cells constitute the configurable network;
  - data passing through a transport cell is based on clock cycles;
  - the selected set of memory modules and the configured set of transport cells are for use by a memory application using the configurable memory system; and
- when two or more memory modules from the selected set of memory modules provide data to the memory application, data form the two or more memory modules are merged to form resulting data.

24. The configurable memory system of claim 23 being part of a configurable device.

25. The configurable memory system of claim 23 wherein the transport network includes a plurality of data paths between its root and the selected set of memory modules.

26. The configurable memory system of claim 25 wherein a time delay provided by the padding element is programmable and based on the clock cycles.

27. The configurable memory system of claim 23 wherein a transport cell of the configured set of transport cells uses a route identification to propagate a message received by that transport cell to an output of that transport cell.

28. The configurable memory system of claim 27 wherein the route identification is associated with the received message.

29. The configurable memory system of claim 23 wherein
- a transport cell of the configured set of transport cells is associated with a plurality of route identifications corresponding to a plurality transport networks;
- a route identification of the plurality of route identifications corresponds to a transport network of the plurality of transport networks; and
- a message traveling on a transport network of the plurality of networks carries a route identification corresponding to that transport network.

30. The configurable memory system of claim 23 further comprising:
- means for identifying the transport network as the first transport network;
- means for identifying the configured set of transport cells as the first set of transport cells;
- means for allowing the first transport network to carry data for the selected set of memory modules; and means configuring a second transport network including a second set of transport cells from the configurable network of transport cells, for
transporting data for the selected set of memory modules.

31. The configurable memory system of claim 30 wherein the first set of transport cells includes a transport cell from the second set of transport cells.

32. The configurable memory system of claim 30 wherein the first set of transport cells includes all transport cells from the second set of transport cells.

33. The configurable memory system of claim 30 wherein the first transport network is identified as a request transport network and the second transport network is identified as a return transport network.

34. The configurable memory system of claim 33 wherein a route identifier for the request transport network is different from a route identifier for the return transport network.

35. The configurable memory system of claim 34 wherein a message traveling through the request transport network carries both the route identifier for the request transport network and the route identifier for the return transport network.

36. The configurable memory system of claim 33 wherein the route identifier for the return transport network is derived from the route identifier for the request transport network.

37. The configurable memory system of claim 33 further comprising means for mapping the route identifier for the request transport network to the route identifier for the return transport network.

38. The configurable memory system of claim 23 wherein a transport cell in the transport network is associated with a plurality of transport networks, and each transport network of the plurality of transport networks is associated with a route identifier.

39. The configurable memory system of claim 38 wherein the route identifier is associated with a message traveling through each transport network.

40. The configurable memory system of claim 23 wherein a transport cell of the transport network is associated with a plurality of transport networks and with a configuration table having entries each being associated with a transport network of the plurality of transport networks.

41. The configurable memory system of claim 23 wherein a first memory operation and a second memory operation use the configurable memory system, and the configurable memory system further comprising means for avoiding conflict of resources used by the first memory operation and the second memory operation.

42. The configurable memory system of claim 41 wherein the means for avoiding uses the clock cycles and information in conflict tables to schedule the first memory operation and the second memory operation.

43. The configurable memory system of claim 41 wherein the means for avoiding uses the clock cycles and information in reservation tables to schedule the first memory operation and the second memory operation.

44. The configurable memory system of claim 23 wherein a transport cell in the transport network includes a latch enabling pipelining data passing through that transport cell.

45. The method of claim 8 wherein no transport cell of the first set of transport cells is included in the second set of transport cells.

46. The configurable memory system of claim 30 wherein no transport cell of the first set of transport cells is included in the second set of transport cells.

* * * * *

UNITED STATES PATENT AND TRADEMARK OFFICE
CERTIFICATE OF CORRECTION

PATENT NO. : 7,146,480 B2
APPLICATION NO. : 10/350458
DATED : December 5, 2006
INVENTOR(S) : Michael S. Schlansker et al.

It is certified that error appears in the above-identified patent and that said Letters Patent is hereby corrected as shown below:

In column 13, line 24, delete "110A," and insert -- 1100A, --, therefor.

In column 17, line 65, in Claim 20, delete "cycle" and insert -- cycles and --, therefor.

In column 19, line 1, in Claim 30, after "means" insert -- for --.

Signed and Sealed this

Twenty-second Day of September, 2009

David J. Kappos
*Director of the United States Patent and Trademark Office*